United States Patent [19]

Has et al.

[11] Patent Number: 4,585,911
[45] Date of Patent: Apr. 29, 1986

[54] SPRING CHARGED OPERATING DEVICE FOR SWITCH

[75] Inventors: Peter V. Has, Haaksbergen; Arend J. W. Lammers, Hengelo; Gerhardus L. Nitert, Enter, all of Netherlands

[73] Assignee: Hazemeijer B.V., Hengelo, Netherlands

[21] Appl. No.: 580,385

[22] Filed: Feb. 15, 1984

[30] Foreign Application Priority Data

Feb. 15, 1983 [NL] Netherlands ............... 8300560

[51] Int. Cl.$^4$ .................. H01H 5/06; H01H 35/00
[52] U.S. Cl. ............................. 200/61.53; 200/78
[58] Field of Search ............. 200/61.45 R, , 61.53, 200/146 R, 150 R, 144 B, 153 SC, 78

[56] References Cited

U.S. PATENT DOCUMENTS

| | | | |
|---|---|---|---|
| 1,872,382 | 8/1932 | Aalborg et al. | 335/172 |
| 2,697,153 | 12/1954 | Owens et al. | 200/146 R |
| 3,226,504 | 12/1965 | Gallistel et al. | 200/61.53 |
| 3,638,501 | 2/1972 | Prachar | 200/61.53 X |
| 3,811,022 | 5/1974 | Guidosh | 200/144 B |
| 3,859,650 | 1/1975 | Prachar | 200/61.53 X |
| 4,345,124 | 8/1982 | Abbin, Jr. et al. | 200/61.53 |

FOREIGN PATENT DOCUMENTS 490173 1/1930 Fed. Rep. of Germany.
2449963 9/1980 France.

Primary Examiner—J. R. Scott
Attorney, Agent, or Firm—Watson, Cole, Grindle & Watson

[57] ABSTRACT

The present invention relates to an apparatus for moving an element, for instance a movable contact of a switch, from a first end position to a second end position and vice versa and selectively keeping the element in each of the noted end positions, the apparatus comprising an energy buffer (1), for instance a spring, mechanically coupled with the element, which can be in two stationary end conditions corresponding with the noted end positions, or in intermediate translation conditions in which potential energy is transduced into kinetic energy and vice versa, a mass (4) driven by the energy buffer (1) which can be moved to one of two end positions corresponding with the end conditions of the energy buffer, and a locking mechanism (8, 34, 31) for locking the mass (4) in its end positions. The locking mechanism consists of a wedge (8) with two wedge portions, each decreasing in cross section in opposite directions, which wedge (8) is positioned between a first surface which is moved with the mass (4) and a second surface, rolling balls (34) positioned between the wedge and the second surface, and a slide (31) for alternately displacing the rolling balls (34) to one of two partial spaces between one of the wedge portions and the second surface in order to press the wedge portion against the first surface by means of the balls (34), so that the mass (4) will be locked in position.

19 Claims, 9 Drawing Figures

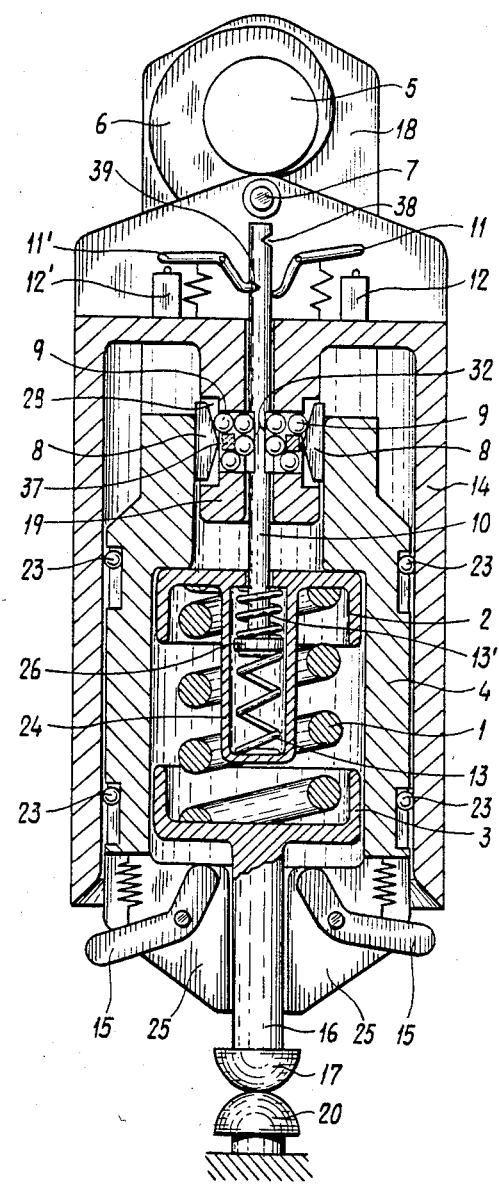

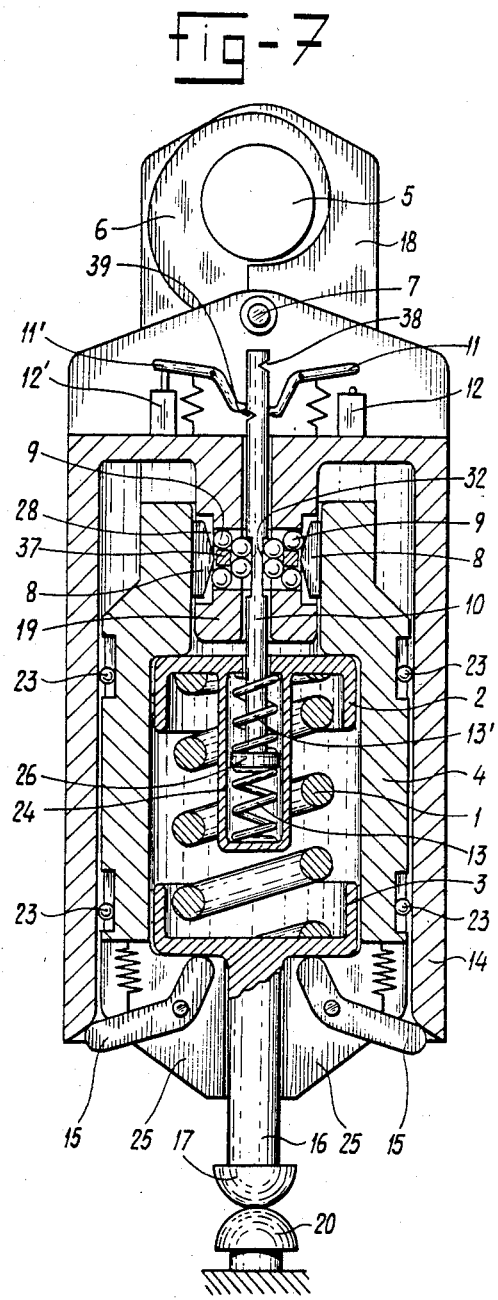

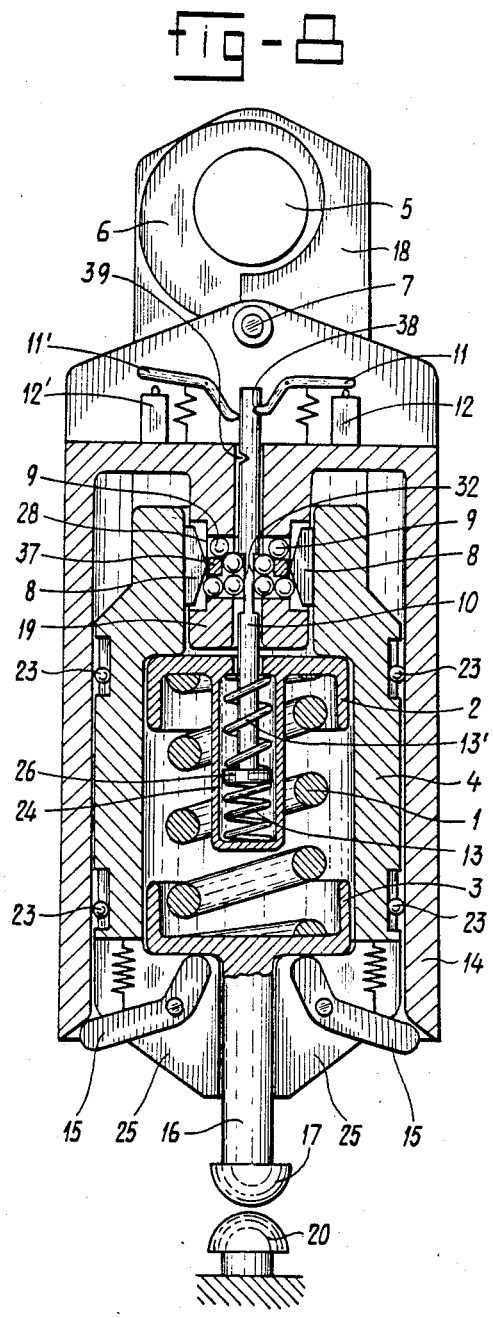

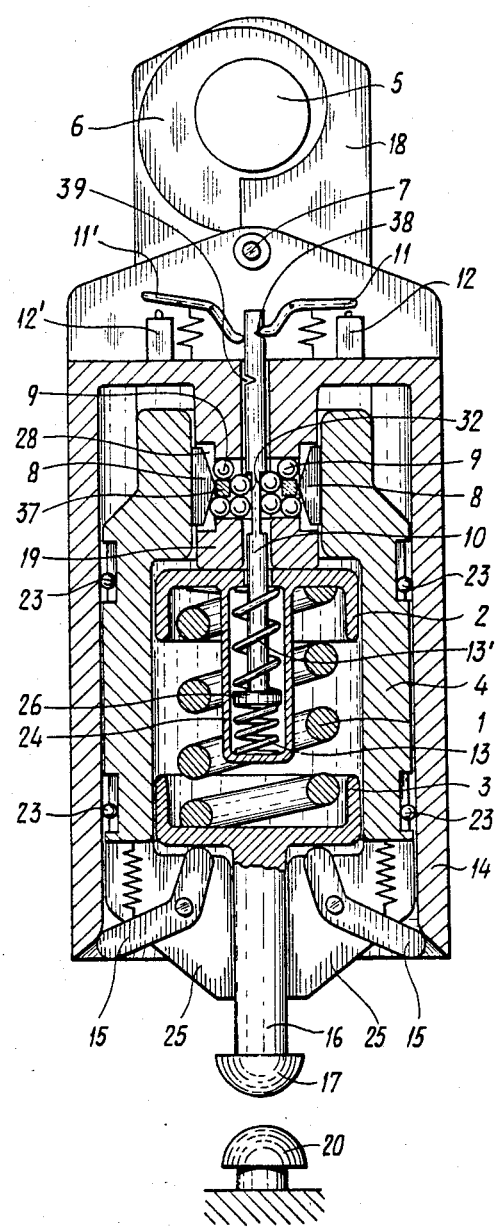

SPRING CHARGED OPERATING DEVICE FOR SWITCH

BACKGROUND OF THE INVENTION

1. Field of the Invention

The invention relates to an apparatus for moving an element from a first to a second end position and vice versa and selectively keeping the element in each of these end positions, comprising an energy buffer mechanically coupled with the element, which can be in two stationary end conditions corresponding with the mated end positions wherein the energy is almost completely present in the form of potential energy, or in intermediate translation conditions, in which potential energy is transduced into kinetic energy and vice versa, a mass driven by the energy buffer, which can be moved to one of the two end positions corresponding with the end condition of the energy buffer, and locking means for the mass, in order to lock the mass in its end position.

2. The Prior Art

A similar apparatus is disclosed in U.S. Pat. No. 3,248,497. The apparatus is used for operating a vacuum switch, whereby the element drives the replaceable contact of the switch. The element consists of a rod, one end of which is fixedly coupled with the connecting portion of a fork, the teeth of which consist of flat parallel strips. The other end of the rod carries the movable contact of the switch. The fork can be replaced in its longitudinal direction with the element and the contact and together with the element and contact can be considered partly as the above-mentioned mass.

Between a spring bottom, mounted on the rod and the wall of the housing, which is traversed by the rod, there is a screw spring which, together with the bellows and the atmospheric pressure acting thereupon, exerts the function of the above-mentioned energy buffer. The screw spring, in combination with the atmospheric pressure, acts upon the bellows of a vacuum switch, dimensioned such, that when the replaceable element, i.e. the contact, the rod and the fork, is locked in one of the two outermost positions of longitudinal movement, a force always acts hereupon, driving back the contact from each of the outermost positions with equal force to the centre position. In the outermost positions a quantity of potential energy is stored either in the bellows with the atmospheric pressure acting thereupon or in the screw spring. If the lock is released in one of the outermost positions, the contact will be driven in the other direction with convertion of potential energy in the screw spring or in the bellows together with the atmospheric pressure acting thereupon into kinetic energy, which means movement of the fork, the rod and the contact, in the other direction, being the switch in direction or switch off direction, according to the foregoing position.

In this known apparatus locking the mass takes place by the means which also produces the movement of the mass. The means consist of a triangular plate which can swing in one of its angles near the free end of the fork portion and is provided with a slot traversed by a cam mounted on the fork portion. The distance from the slot to the swinging point of the triangular plate varies, so that when swinging the plate the fork portion together with the element coupled therewith is moved. The cam then runs from the one end of the slot to the other end. Locking takes place by holding the triangular plate in one of its end positions by means of electromagnetic means, in which the cam is in one of the respective slot ends.

This combination of moving means and lock means forms a relatively heavy and large assembly, whereas relatively much electric power is necessary for the operation.

SUMMARY OF THE INVENTION

The invention provides an apparatus of the kind mentioned above in which the lock means serves to keep the mass only in its outermost positions which apparatus also operates with less power.

The apparatus according to the invention is characterized by at least one double wedge with two wedge portions with relating wedge surfaces, said wedge portions, decreasing in cross section in opposite directions, the wedge being positioned in a space between a first surface which can be moved with the mass and a second surface, whereby the mentioned decreasing wedge portions each extend in one of the moving directions of the mass;

locking means operating with rolling friction, this means being positioned in the space between the double wedge and the second surface;

means for alternately displacing the locking means to one of the two partial spaces between one of the wedge portions and the second surface in order to press one of the wedge portions against the first surface by means of the locking means, the arrangement being such that during a succeeding replacement of the first surface with respect to the second surface into the direction of the wedge portion which is pressed against the first surface, the wedge will be clamped between the locking means and the first surface, through which this as well as the mass is locked against further movement.

In the apparatus according to the present invention only the means for displacing the locking means have to be replaced for unlocking the mass. These may be means with relatively little mass, such as a slide or a pin which needs little power for replacing and holding. In the apparatus according to the invention the locking is automatically effected as soon as the mass, after having reached an end position in which all energy is stored in the energy buffer, starts to return because of this store power. With this movement the wedge will be clamped between the locking means supported by the second surface and the first surface coupled with the mass. The locking means have been prepared for locking action by means of the this means. As a result of the wedge action, the mass will be stopped almost immediately. To unlock the mass the means for replacing the locking means have to be operated. By the rolling friction of the locking means only very little power is necessary for such replacement, in particular if the locking means act upon a relating second surface from an opposite surface.

The apparatus according to the invention is for example applicable in an apparatus according to U.S. Pat. No. 4,527,026. Herein the mass is resiliently removable over a certain distance with respect to the energy buffer and with respect to the element, so that if the element reaches one of its positions, the mass can be moved to its relative end position over a certain distance, while further transforming kinetic into potential energy. The locking means used in the apparatus according to the present invention are especially suitable to keep the mass in the above-mentioned positions because no other mechanical means act upon the mass, which means according to the invention should be counteracted as well by the locking mechanism, such as in the apparatus known from U.S. Pat. No. 3,248,947, which mass at the locking moment is nearly stationary. Therefore, the apparatus according to the invention can be of simple construction.

A preferred embodiment of the apparatus according to the invention is characterized in that the replacement means are provided with a surface opposite the wedge and with two oppositely raised edges, defining the surface, the surface and the raised edges forming part of the second surface, in which the second surface is coupled to the operating member, the raised edges alternately forming stop edges for the locking means such that in one position of the operating member a number of locking means in the one partial space is kept between the surface and one of the wedge portions by means of one of the raised edges, so that the wedge portion is pressed against the first surface and the locking action is maintained in the one direction whereas by replacing the operation member to the other position the locking action in the one direction is removed and subsequently a number of locking means is replaced and kept in the other partial space by means of an oppositely raised edge so that locking action is obtained in the other direction.

Preferably the surface and the raised walls are formed by a recess in the second surface. The space between the wedge and the second surface can be limited further by transverse walls.

The distance between the thick centre portion of the wedge and the opposite surface of the recess in the second surface should be sufficient for passing a locking means under rolling movement, preferably balls or rollers. The length of the recess, seen in the direction of replacement of the second surface, should be such that the balls or rollers are not hindered during replacement of the surface and that sufficient balls may pass the narrow space opposite the thicker centre portion. This recess should be at least that long, seen in the replacement direction of the surface, that at least two balls or rollers can be pressed away by the wedge.

The wedge comprises at least one side with two oblique roof-like walls, each running from the centre portion into one of the of the opposite directions. The other side of the wedge may be flat. The wedge may be positioned such that the flat portion rests on the first surface, but also the reverse position is possible, whereby one of the two oblique walls is resting on the first surface. When unlocking and replacing the balls or rollers the wedge will turn around the cam edge, also resting on the first surface, so that for locking action one of the oblique surfaces may be pressed against the first surface.

The wedge also may cooperate with a groove in the first surface running in the direction of replacement of the first surface and provided with rising tapered walls. The wedge action is obtained when pressing the wedge into the groove, the wedge preferably being tapered as well. This results in a greater friction force.

Also arresting means may act upon both opposite ends of the wedge portions, which as the second surface are also replaced by the operating member and press the wedge further in the locking position. This also may be realized by coupling the wedge to the operating member by means of resilient means.

The present invention is preferably suitable for an apparatus, provided with a housing, a hollow mass movable to and from in the housing, an energy buffer housed in the mass, the buffer in both ends being provided with an end member, which can cooperate with a stop member connected to the mass in order to keep the the energy buffer enclosed in the mass, at least one abutment at one end of the housing which can penetrate through a passage in the hollow mass when it is in one of its end positions. This apparatus is characterized in that the abutment narrowly fits in the passage of the mass and that in said abutment space is formed for accepting the double wedge and the locking means and comprises a longitudinal bore housing a longitudinally replaceable operating pin, whereby the first surface on which the double wedge can be pressed, is formed by the inner wall of the passage of the hollow mass, whereas the second surface forms the outer wall of the movable operating pin. Preferably at least two double wedges are in opposite relationship in the passage, resting on opposite walls of the passage. The operating pin for locking the mass in both end positions preferably operates electromagnetically. The end of the operating pin may be spring-loaded with respect to a spring cup for a screw spring forming the energy buffer. By shifting the operating pin a spring force starts to act upon the pin, by which the pin is replaced such that the recess or recesses in the pin is and are shifted respectively to the other locking position. The operating pin further may be coupled with the arresting means for the wedge through elastic means. When replacing the pin one of the arresting means will be pressed then elastically against an opposite end of the double wedge.

The apparatus according to the invention preferably is used for operating a movable contact of a switch by means of the movable element.

The invention will be further elucidated with respect to the drawings which show some preferred embodiments.

DESCRIPTION OF THE DRAWINGS

FIGS. 4–9 show an operating cycle in various steps of an embodiment of the apparatus according to the invention indicated more in detail, for use in a switch.

DETAILED DESCRIPTION OF THE PREFERRED EMBODIMENTS

Figure 1:
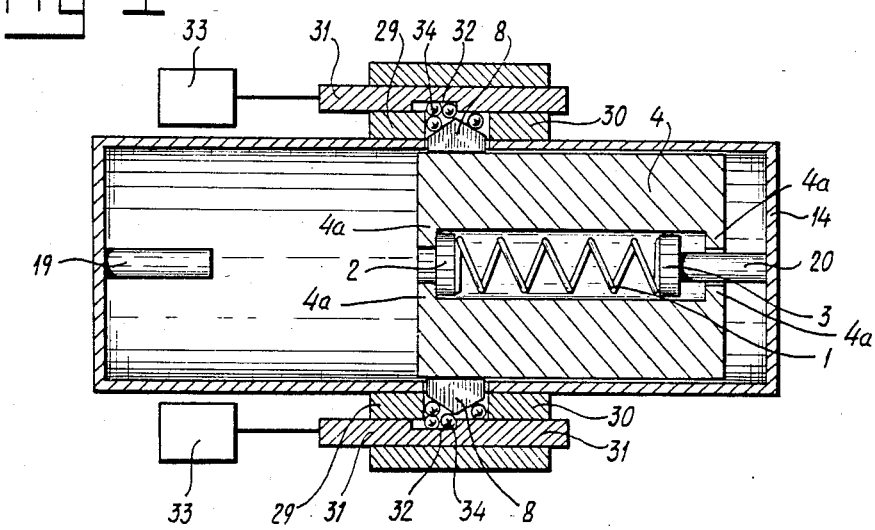
FIG. 1 shows the principle of a locking mechanism according to the invention, applied in an apparatus according to U.S. Pat. No. 4,527,026.

With respect to the operating of the embodiment indicated in FIG. 1, reference is made partly to U.S. Pat. No. 4,527,026.

The apparatus of FIG. 1 consists of a mass 4 which is movable to and fro within a housing 14. An energy buffer in the form of a helical spring 1 is housed in the mass 4, the screw spring cooperating at its respective ends with spring cups 2 and 3. The screw spring and spring cups are kept in place in the mass 4 by stop members in the form of inwardly directed flanges 4a. At one end of the housing there is an abutment 19 and at the other end an abutment 20. The abutment 20 may form, for example, one of the two contacts of a switch, the other contact being mounted on the spring cup 3.

The locking mechanism in the apparatus according to the invention consists of wedges 8, resting with a matching surface on the outer surface of the mass 4. The wedges extend through openings in the housing 14. These two-sided wedges comprise two oblique surfaces forming a roof, which extends in a space defined by walls 29 and 30. Operating members such as slides 31, are supported by these walls, which slides can be displaced to and fro, in FIG. 1 to the right and to the left. Slides 31 include recesses 32. In FIG. 1 the recesses are indicated in their left end position. The slides may be operated by schematically shown devices 33, which may be of electromagnetical kind. Arresting members 34 in the shape of balls are located in the space between wedges 8 and recesses 32.

In FIG. 1 the mass is shown in its outermost right-hand position. In this position spring 1 is entirely compressed and mass 4 is stopped after having moved from the left to the right. Mass 4 is driven back to the left by spring 1. Wedges 8 press balls 34 outwardly against the wall of recess 32. This recess has a length such that the balls in the recesses cannot be pressed away to the right in said position. By further displacing wedge 8 it is clamped between the outer wall of the mass 4 and the wall of the recess 32 as a result of which the mass will be locked. The locking is operative immediately as soon as the mass returns.

When mass 4 is to be displaced to the left again the locking action must be ended. This takes place by displacing slide 31 to the right by means of electromagnetic means 33. On account of the rolling friction only a little force is needed. The right transverse wall of the recess does not arrest balls 34 anymore. By this the pressure upon wedges 8 immediately disappears and mass 4 is released and is driven to the left by the potential energy in the spring. Finally spring cup 2 abuts against abutment 19. However, the mass will move further on account of the kinetic energy stored in the mass itself. Upon arriving in it outermost left position mass 4 is stopped again.

Slide 31 displaced to the right upon removing the locking action has taken along balls 34 to the right by the left wall of recess 32 and is pressed in the position in which there are two balls between the other oblique wall of wedge 8 and the surface of recess 32. Consequently the locking mechanism, when removing the locking action for the one direction, is immediately prepared for locking action in the other direction. When reversing the direction of movement of mass 4 as a result of the wedge action, wedges 8 will lock mass 4 in the same way as indicated above for the other position.

Figure 2:
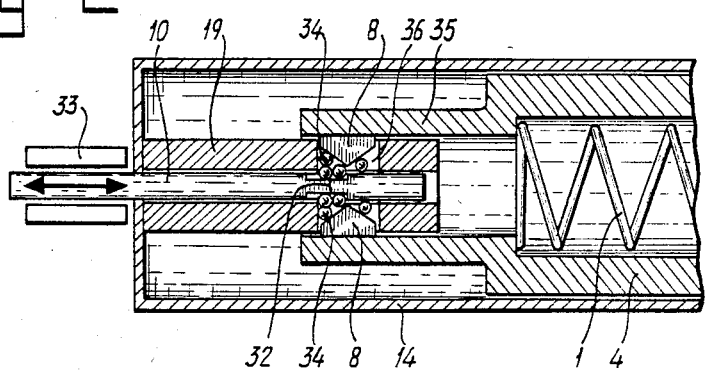
FIG. 2 shows an amended embodiment of a locking mechanism according to the invention.

The wedges schematically shown in FIG. 1, which for clearness' sake have been shown much larger than necessary, may be housed for instance in one of the abutments 19 or 20. This abutment will extend in all positions of the mass within a passage to the hollow space in mass 4, in which screw spring 1 is located. A similar embodiment is shown in FIG. 2 in which the corresponding parts are indicated with the same reference numbers as used in FIG. 1.

Abutment 19 extends within a passage in a cylindrical extension 35 of mass 4. In the abutment a space 36 is formed for housing balls 34. Further there are wedges 8 in space 36, whereas the space is traversed by an operating pin 10 including recesses or notches 32 where the pin 10 traverses the space 36.

Operating pin 10 can be replaced to and fro by means of the schematically indicated electromagnetic means 33, whereby recess 32 in the pin is located at the right end or at the left end of space 36, i.e., opposite the right oblique surfaces of wedges 8 or opposite the left oblique surfaces of the wedges 8. In the position indicated in FIG. 2 mass 4 is in its outermost right position which corresponds with the position in FIG. 1. In this position the mass is held by means of the locking mechanism according to the invention. Operating pin 10 is in its outermost left position. As a result balls 34 are clamped between the left oblique surfaces of wedges 8 and the surface within the recess 32 in pin 10. Wedges 8 are pressed against the inner side of the passage in cylindrical extension 35. When mass 4 is to be moved to the left, wedges 8 will be clamped, further locking mass 4. When the locking action is to be removed pin 10 is displaced to the right. Balls 34 are taken along now with rolling friction, which balls now cannot press wedges 8 against the wall of the passage, as a result of which mass 4 is released and as a result of the force of spring 1 the mass 4 will be moved to the left. Now balls 34 are in the right portion of the space between the right oblique surfaces of wedges 8 and the opposite recess 32, as a result of which the mechanism is prepared for the other direction. As soon as mass 4 will move to the right when reversing again wedges 8 are pressed by the balls against the inner wall of cylindrical extension 35 and the mass is locked again by the wedge action.

In all practical embodiments the wedge surfaces should have an angle of inclination sufficiently small that wedges 8 are self-braking. However, this angle should be sufficiently large that with a relatively small displacement the locking action will be removed. The number of balls or rollers corresponds with the requirement to displace the operating member with the recess 32, in FIG. 2 pin 10, from the one latch position to the other across a distance as short as possible.

Figure 3:
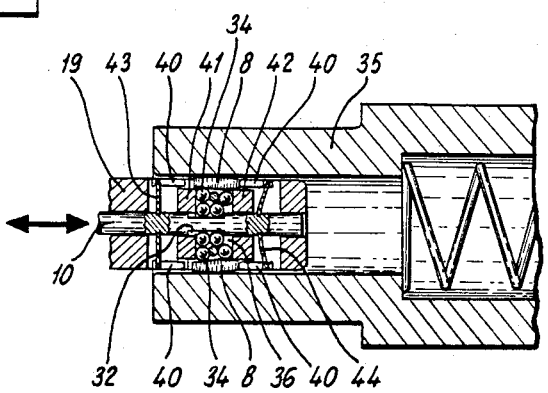
FIG. 3 shows an other embodiment of the wedge in a latch mechanism according to FIG. 2.

FIG. 3 shows an embodiment with a different wedge shape. Also the wedge action is intensified. The reference numbers indicate corresponding elements to those in FIGS. 1 and 2.

The operating member is formed again by pin 10 including recesses 32 at the position where wedges 8 and balls 34 are situated in the passage of cylindrical extension 35. Wedges 8 are of another shape than indicated in FIGS. 1 and 2. In the last-mentioned figures the wedges 8 are pressed with an entirely flat or a matched surface against the first surface which will be moved with mass 4. The oblique wedge surfaces are exclusively positioned at the side of balls 34. Instead in FIG. 3 the wedges decrease at both sides in both opposite directions from a thicker centre portion, at the side of the first surface as well as at the side of the balls or rolls 34. When reversing the locking position by displacing operating pin 10 and as a result rolling away the balls or rolls 34, wedges 8 will tip about the roof edge of the thicker centre portion, which is supported by the first noted surface.

Furthermore in this embodiment means are applied for intensifying the wedge action. However, it is self-evident that the means are not necessary in using this different wedge shape. The noted means consist of pressing members 40, located in the space left between the walls 41 and 42 belonging to the abutment 19 and the first surface, here formed by the inner wall of extension 35. The pressing members 40 are connected to spring cups 43 and 44, which are held in their centre position by grooves in the operating pin 10.

In FIG. 3 the operating pin is shown in the left position, by which the movement of extension 35 and consequently of mass 4 to the left is blocked because wedges 8 are pressed by friction between balls 34 pressed to the left, and the inner surface of extension 35. When displacing the pin to the left spring cups 43 and 44 are carried along. As appears from the Figure the right spring cup 44 presses in this position the right pressing members 40 against the right ends of wedges 8. As a result of this the wedges are firmly pressed in the space between the wall of extension 35 and balls 34. This position of wedges 8 is reached nearly immediately reached after unlocking the one position and consequently already when preparing for the other position to be locked. Consequently, the wedges are already immediately pressed in their locked position more strongly than without the means. When the mass, after arrest, reverses direction, it will be locked more quickly than without the mentioned means, so that less displacement power will be lost.

One of the pressing members 40 can be permanently coupled with the end of wedge 8. In this case upon displacement operating pin 10 acts immediately upon wedge 8. An assembly of spring cup 43 and pressing member 40 then can be omitted.

Wedges 8 may have a flat surface at the side of the balls 34.

FIGS. 4-9 show various positions of an embodiment of the apparatus having a locking mechanism according to the present invention. This is used here for operating a switch having the schematically shown contacts 17 and 20. These may be contacts of a vacuum switch, but also of an oil switch or a gas switch.

FIGS. 4 to 9 show various stages of a complete operating cycle of the switch, i.e., from switching off to switching on and back to the switching off position. This apparatus consists of an energy buffer 1 in the form of a screw spring between a first spring bottom 2 and a second spring bottom 3. These parts are housed within a mass 4. Mass 4 for instance can move to and fro in housing 14 by means of roller bearings 23.

Figure 4:
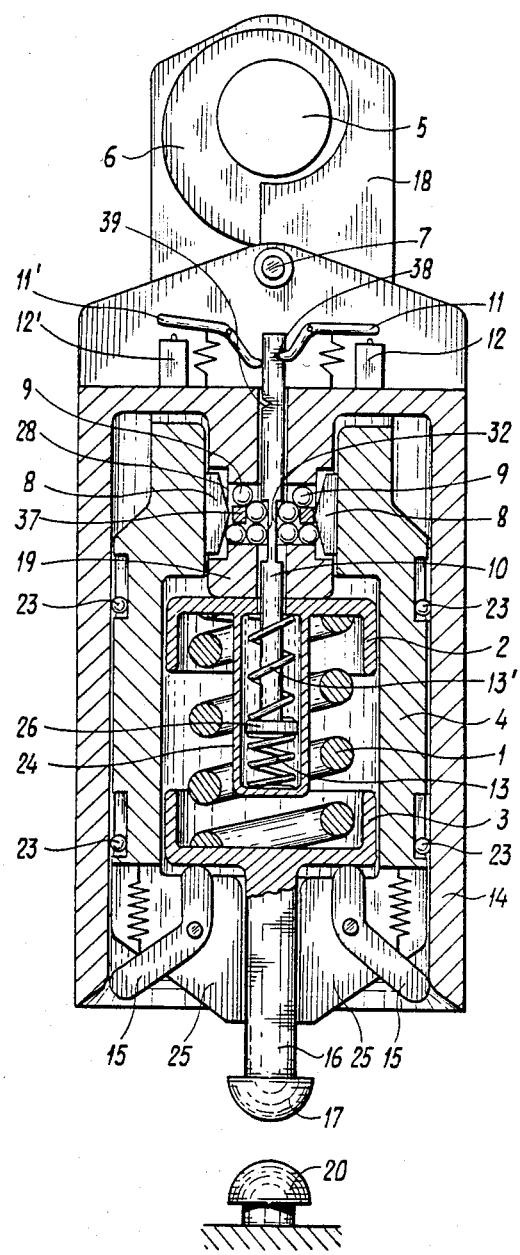

In the position of FIG. 4 the spring bottom 2 rests against an abutment 19, formed at the upper end of housing 14. Spring bottom 3 rests against stretching levers 15, connected to extensions 25 of mass 4. The function of the stretching levers is elucidated hereafter.

A drive pin 16 is connected to spring bottom 3, ending in an element 17, here the movable contact of a switch.

The locking means consist of the following parts. An operating pin 10 traverses a bore in abutment 19, the pin at the upper side extending till the extension of the upper surface of housing 14 and extending downwards till within the energy buffer or spring 1. The downward end of the operating pin 10 is inserted in a housing 24 formed at the spring bottom 2, in which springs 13 and 13' are located, which may drive the operating pin 10 upwards and downwards by means of a flange 26 formed at pin 10, according to the position in housing 24.

About half-way along its length operating pin 10 comprises recesses 32, positioned in a recess 28 in abutment 19. In the recess 28 on both sides of the recesses 32 in operating pin 10 there are roller pins 9, which will be displaced upwards and downwards around cams 37 by shifting operating pin 10 in recess 28.

Reference number 8 shows a double wedge, resting against a passage in mass 4 with a matched surface. A similar wedge is positioned at both sides of operating pin 10. The roof-shaped oblique surfaces of wedges 8 are turned towards roller pins 9. Wedges 8 can also be placed in reversed position.

In the position according to FIG. 4 the roller pins 9 are located at the bottom, two of which being positioned between operating pin 10 at the location of recesses 32 and the oblique bottom surface of wedges 8.

At the upper surface of housing 4 two electromagnets 12, 12' are mounted, cooperating with levers 11, 11', one end of which gripping in a recess 38 or 39 respectively in operating pin 10. The other ends of the levers 11, 11' cooperate with electromagnets 12, 12' and may be operated by them, through which their opposite ends may fall in recesses 38, 39, whereby operating pin 10 will be locked in one of two outermost positions. The operating pin 10 is displaced by energy stored in springs 13 and 13'.

At the upper side in FIG. 4 a motor 5 is schematically shown, on the shaft of which a stretching pulley or excentrique 6 is mounted. Its outer surface runs across a roller bearing 7. The motor is mounted on a plate 18, connected with mass 4, whereas roller bearing 7 is connected to housing 14. When turning the stretching pulley which elastically is pressed against roller bearing 7, housing 14 and the mass are displaced with respect to each other. By this mass 4 after each operating cycle can be returned into its starting position.

Figure 5:
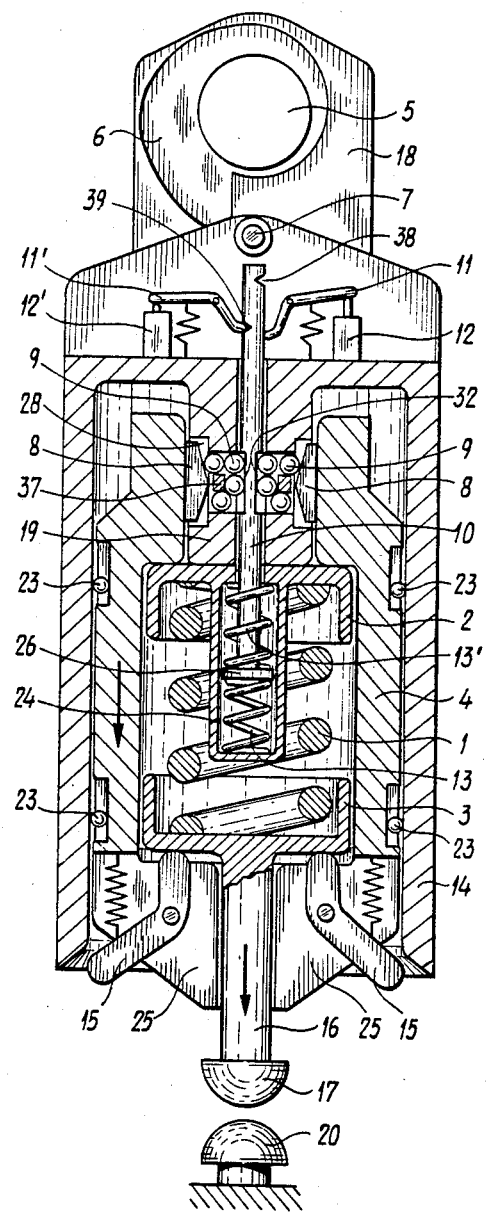

The operation of the apparatus is as follows:

FIG. 4 shows the starting position in which the switch with contacts 17 and 20 is opened at the moment that release coil 12 is operated. Lever 11 releases operating pin 10 which under the influence of spring 13 tensioned during a preceding cycle moves upwards. During the movement roller pins 9 located in recess 32 of operating pin 10 and recesses 28 of abutment 19 move upwards, so that wedges 8 no longer press against the inner wall of recess 28, by which the mass no longer is locked against downward displacement. The situation then will be as indicated in FIG. 5. Here operating pin 10 is fixed by lever 11', one end of which touches recess 39 of operating pin 10. Up till now tensioned spring 1 could not release, because it is prevented on the one side by spring bottom 2, adjacent abutment 19 of housing 14, and on the other side by stretching levers 15, connected through spring bottom 3 and mass 4, and the mass held by the two-sided wedges 8 and the roller pins 9 in abutment 19 of housing 14. However, now the spring may release, so that spring bottom 3 and by stretching levers 15 also mass 4 may move downwards. Because drive pin 16 is connected to spring bottom 3 the drive pin should also move downwards and so will displace the element from the one end position to the other end position. When displacing operating pin 10, balls or rolls 9 are moved upwards preparing the lock for the other position of the mass.

The situation indicated in FIG. 5, in which spring bottoms 2 and 3 each are arrested by the mass and spring 1 cannot release further, the potential energy stored in the spring 1 is transformed into kinetic energy. As a result mass 4 will move further downwards and take along spring 1 and spring bottoms 2 and 3.

FIG. 6 shows the situation at the moment contact 17 reached its end position already, and pushes against stationary contact 20. The kinetic energy in mass 4 will move it further whereas spring bottom 3 is arrested through drive pin 16 and contacts 17, 20. By the moving mass 4 and spring bottom 2 spring 1 is tensioned. During the tensioning of spring 1 the kinetic energy of mass 4 is transformed into potential energy in spring 1. The velocity of mass 4 decreases to zero at the moment, that the kinetic energy is entirely transformed into potential energy and mass 4 will start to move in the opposite direction under the influence of the potential energy in spring 1. However, this is almost immediately prevented because the oblique wall of double wedge 8 abuts roller pins 9 in the upper side of recess 28, by means of which mass 4 is clamped and immediately is arrested.

During the downward movement of mass 4 spring 13' is tensioned from the moment that spring bottom 2 is released from housing 14. Also one end of hold lever 11' falls into recess 39 of operating pin 10 by means of which this pin is fixed in this position. This means that the switch reached its switched on position and is kept in this position.

When contact 17 should be moved from the end position with switched on switch indicated in FIG. 6 to the end position according to FIG. 1 in which the switch is switched off, release coil 12' is operated, see FIG. 7. Lever 11' releases operating pin 10, which moves downwardly under the influence of spring 13' tensioned before and takes along roller pins 9 in recesses 32. The two-sided wedges 8 no longer is clamped against mass 4, so that it can be moved upwardly. Because spring 1 has potential energy and spring bottom 3 is fixed through drive pin 16 and contact 17 the spring will move spring bottom 2 upwardly taking along mass 4.

In FIG. 7 the moment is shown on which the upwardly moving mass 4 strikes against the bottom of spring bottom 3. From that moment on spring bottom 3 with the connected drive pin 16 and contact 17 will be moved upwardly and contact 17 moves from the end position in FIG. 5 to the end position indicated in FIG. 8.

Under the influence of the kinetic energy in mass 4 the assembly of mass 4, spring bottom 3 and drive pin 16 as well as contact 17, the spring and spring bottom 2 moves further upwardly until the upper side of spring bottom 2 rests against abutment 19 of housing 14 again, which is indicated in FIG. 9. From this moment on the kinetic energy of mass 4 will be transformed into potential energy because spring 1 is compressed between spring bottoms 2 and 3 by the moving mass 4. At the moment at which all kinetic energy is transformed and mass 4 reverses its direction of movement, this is prevented because during the preceding release action operating pin 10 is fixed by lever 11, whereby roller pins 9 clamp mass 4 in housing 14 through double-sided wedges 8. The situation then is as indicated in FIG. 9.

Because inevitably energy is lost during the cycle of movement from the situation in FIG. 4 to that in FIG. 9, mass 4 will not return fully to the original position indicated in FIG. 6. To reach this position the energy supply means are put into operation, i.e., motor 5 is energized by means of which tension roller 6 will start to rotate. Because motor 5 and tension roller 6 are fixedly connected with mass 4 through connection plate 18, the tension roller will press downwardly housing 14 through roller bearing 7, through which the spring is further tensioned through spring bottom 2 so that the starting situation of FIG. 3 is reached again.

The stretching levers 15 are used only in case the velocities in both directions should be different. This is achieved by varying the distance mass 4 should cover before element 17 is taken along, which in the present embodiment is done by means of stretching levers 15. By this means extra switching off energy is available. This is achieved by tensioning spring bottom 3 and fixing it in this position before switching on. Spring bottom 3 is raised during switching off because stretching levers 15 run against the inner wall of the housing and turn.

It is obvious that the invention is not limited to the apparatus shown in the figures. Operating pin 10 can also be operated by other means than the electromagnetic means shown in FIGS. 4–9. Instead of supplying through the motor and tension roller 6 the mass can be moved to its starting position in another manner. Besides or instead of a screw spring, pneumatic and/or hydraulic means may be used.

We claim:

1. A device for operating a movable actuation rod of a switch, said device comprising
 a housing having opposite first and second housing ends, said first housing end being capable of mounting thereon a switch having said movable switch actuation rod extending at least partly into said housing, said housing including stop means at the second housing end,
 a mass movably positioned in said housing, said mass having opposite first and second mass ends,
 an actuation element at the first mass end and capable of driving said switch actuation rod,
 a support means at the second mass end and capable of cooperating with said stop means,
 means arresting movement of said actuation element and said support means along said mass,
 an elastic energy storage means associated with said mass through said actuation element and said support means,
 a locking means associated with said mass for holding said mass in a first end position nearest the first housing end at the moment the kinetic energy of said mass is zero and to hold said mass in a second end position nearest the second housing end at the moment the kinetic energy of said mass is again zero, said locking means including
   at least one double wedge with two wedge portions with relating wedge surfaces, said wedge portions decreasing in cross section in opposite directions, said wedge being positioned in a space between a first surface which moves with said mass and a second surface, whereby said decreasing wedge portions each extend in one of the directions of movement of said mass;
   arresting means operating with rolling friction, said arresting means being positioned in said space between the double wedge and the second surface; and
   control means for alternately displacing the arresting means to one of the two partial spaces between one of the wedge portions and the second surface in order to press one of said wedge portions against the first surface by means of said arresting means, the arrangement being such that during a succeeding movement of the first surface with respect to the second surface in the direction of the wedge portion which is pressed against the first surface, the wedge will be clamped between the arresting means and the first surface, such that the wedge and the mass will be prevented from further movement, said mass being movable within said housing between said first mass end position nearest the first housing end and said second mass end position nearest the second housing end, thus transforming potential energy into kinetic energy and vice versa; and when a switch with said movable switch actuation rod is mounted at the first housing end, such that its actuation rod extends into said housing, said device will operate as follows:

(1) just before said mass is locked in said first mass end position by said locking means and after said switch actuation rod has pushed said actuation element to an end position nearest the second mass end, thereby concurrently moving said switch actuation rod inwardly of said switch to an end position defined by the closed state of said switch, said mass will convert its remaining kinetic energy into potential energy while further moving into said first housing end position, thereby compressing said energy storage means and increasing its stored potential energy, (2) when said locking means releases said mass, said energy storage means will expand, causing said mass to move toward the second housing end, its storage potential energy being converted to kinetic energy, said switch actuation rod at the same time being allowed to move outwardly of said switch, and (3) just before said mass is locked in said second mass end position by said locking means and after said stop means has pushed said support means towards said actuation element and caused said support means to take up an end position farthest from the second mass end, said mass will convert its remaining kinetic energy into potential energy while further moving to its second mass end position, thereby compressing said energy storage means and increasing its stored potential energy.

2. A device according to claim 1, wherein said control means is provided with a surface opposite the wedge and with two oppositely raised edges defining said surface, the surface end and the raised edges forming part of the second surface, in which the second surface is coupled to an operating member, said raised edges alternately forming stop edges for the arresting means such that in one position of the operating member a number of arresting means in the one partial space is kept between said surface and one of said wedge portions by means of one of said raised edges, so that said wedge portion is pressed against the first surface and the locking action is maintained in the one direction whereas by moving the second surface to the other position the locking action in the one direction is removed and subsequently a number of arresting means are moved and kept in the other partial space by means of an oppositely raised edge so that locking action is obtained in the other direction.

3. A device according to claim 2, wherein the surface and the raised walls are formed by a recess in the second surface.

4. A device according to claim 1, wherein said arresting means consist of spherical balls of solid material.

5. A device according to claim 1, wherein said arresting means consist of rollers of solid material.

6. A device according to claim 1, wherein said wedge comprises at least one side with two oblique roof-like surfaces, each running from the centre portion in one of the opposite directions.

7. A device according to claim 6, wherein the other side of said wedge is flat and directed towards the first surface.

8. A device according to claim 6, wherein the side of said wedge with the roof-like oblique surfaces is directed towards the first surface and that wedge may tilt around the cam edge so that for locking action one of the oblique surfaces is to be pressed against the first surface.

9. A device according to claim 1, wherein said wedge cooperates with a groove with tapered rising walls, said groove being situated in the direction of displacement, the arrangement being such that a wedge action is obtained when the wedge is pressed into the groove.

10. A device according to claim 1, wherein the distance between the centre portion of said wedge and the opposite second surface is narrowed to a distance which is sufficient for the passage of said arresting means.

11. A device according to claim 2, wherein said wedge cooperates with the operating member such that the wedge is always pressed in the relative locking position.

12. A device according to claim 11, wherein said wedge in both ends of the decreasing wedge portions is positioned opposite pressing members, which can be displaced by the operating member to and from the opposite end of the wedge and consequently can press the wedge further in the locking position.

13. A device according to claim 11, wherein said wedge is resiliently coupled with the operating member.

14. A device according to claim 1, including a housing, a hollow mass movable to and fro in the ends being provided with an end member which can cooperate with a stop member connected to the mass in order to keep the energy buffer enclosed in the mass, at least one abutment at one end of the housing which can penetrate through a passage in the hollow mass when it is in one of its end positions, wherein that the abutment narrowly fits in the passage of the mass and that in said abutment space is formed for accepting the double wedge and the locking means and comprises a longitudinal bore housing a longitudinally movable operating pin, whereby the first surface on which the double wedge can be pressed, is formed by the inner wall of the passage of the hollow mass, whereas the second surface forms the outer wall of the movable operating pin.

15. A device according to claim 14, wherein at least two double wedges are in opposite relationship in the passage, resting on opposite walls of the passage.

16. A device according to claim 14, wherein the recesses of the operating pin can be displaced electromagnetically such that these recesses are positioned opposite the double wedges in order to lock the mass in one or the other end position.

17. A device according to claim 14, wherein one end of the operating pin is spring loaded with respect to a spring cup for a screw spring forming the energy buffer and positioned at one side of the abutment, the arrangement being such that by shifting the operating pin a spring force will act upon said pin, displacing said pin such that the recess in the pin is shifted to the other locking position.

18. A device according to claim 17, wherein the operating pin is coupled through elastic means with the pressing members, so that when displacing the pin one of the pressing members is elastically pressed against an opposite end of the double wedge.

19. A device according to claim 17, wherein the operating pin is coupled with the wedge by means of a spring, so that when displacing the pin a pressure force is exerted on the wedge.

* * * * *